(12) United States Patent
Tyler

(10) Patent No.: US 10,880,956 B2
(45) Date of Patent: Dec. 29, 2020

(54) MULTI-STRAND ADDITIVE MANUFACTURING SYSTEM HAVING IMPROVED CORNERING

(71) Applicant: CC3D LLC, Coeur d'Alene, ID (US)

(72) Inventor: Kenneth Lyle Tyler, Coeur d'Alene, ID (US)

(73) Assignee: Continuous Composites Inc., Coeur d'Alene, ID (US)

(*) Notice: Subject to any disclaimer, the term of this patent is extended or adjusted under 35 U.S.C. 154(b) by 215 days.

(21) Appl. No.: 15/890,933

(22) Filed: Feb. 7, 2018

(65) Prior Publication Data

US 2018/0229434 A1 Aug. 16, 2018

Related U.S. Application Data

(60) Provisional application No. 62/459,398, filed on Feb. 15, 2017.

(51) Int. Cl.
| | |
|---|---|
| H05B 3/28 | (2006.01) |
| B33Y 70/00 | (2020.01) |
| B29C 64/165 | (2017.01) |
| B29C 70/88 | (2006.01) |
| B33Y 10/00 | (2015.01) |
| B33Y 30/00 | (2015.01) |
| B29C 64/232 | (2017.01) |
| B29C 64/245 | (2017.01) |
| B29C 64/209 | (2017.01) |
| B29C 64/236 | (2017.01) |
| B29C 64/241 | (2017.01) |
| B29C 70/20 | (2006.01) |

(Continued)

(52) U.S. Cl.
CPC ........... *H05B 3/286* (2013.01); *B29C 64/165* (2017.08); *B29C 64/209* (2017.08); *B29C 64/232* (2017.08); *B29C 64/236* (2017.08); *B29C 64/241* (2017.08); *B29C 64/245* (2017.08); *B29C 64/291* (2017.08); *B29C 64/393* (2017.08); *B29C 70/207* (2013.01); *B29C 70/384* (2013.01); *B29C 70/885* (2013.01); *B33Y 10/00* (2014.12); *B33Y 30/00* (2014.12); *B33Y 70/00* (2014.12); *C01B 32/194* (2017.08); *B29K 2101/10* (2013.01); *B29K 2995/0007* (2013.01); *B29L 2031/753* (2013.01); *B29L 2031/779* (2013.01); *B33Y 80/00* (2014.12); *H05B 2203/011* (2013.01); *H05B 2203/014* (2013.01)

(58) Field of Classification Search
CPC ............................ B29C 64/264; B29C 64/209
See application file for complete search history.

(56) References Cited

U.S. PATENT DOCUMENTS

| | | | | |
|---|---|---|---|---|
| 5,121,329 A | * | 6/1992 | Crump | B33Y 50/02 |
| | | | | 700/119 |
| 5,936,861 A | * | 8/1999 | Jang | G05B 19/4099 |
| | | | | 700/98 |

(Continued)

*Primary Examiner* — Matthew J Daniels
*Assistant Examiner* — Wayne K. Swier
(74) *Attorney, Agent, or Firm* — Ryan Stockett

(57) ABSTRACT

A head is disclosed for use with an additive manufacturing system. The head may include a nozzle configured to discharge multiple fiber strands oriented transversely adjacent each other relative to a travel direction of the head. The head may also include a matrix supply separately associated with each of the multiple fiber strands.

18 Claims, 3 Drawing Sheets

(51) Int. Cl.
*B29C 70/38* (2006.01)
*C01B 32/194* (2017.01)
*B29C 64/291* (2017.01)
*B29C 64/393* (2017.01)
*B33Y 80/00* (2015.01)
*B29L 31/00* (2006.01)
*B29K 101/10* (2006.01)

(56) References Cited

U.S. PATENT DOCUMENTS

| | | | | |
|---|---|---|---|---|
| 6,121,329 A * | 9/2000 | Fujii | ............... | A61P 37/06 514/653 |
| 6,214,279 B1 * | 4/2001 | Yang | ............... | B33Y 50/02 264/482 |
| 8,029,259 B2 * | 10/2011 | Brown | ............... | B29C 48/001 425/72.2 |
| 8,827,684 B1 * | 9/2014 | Schumacher | ......... | B29C 64/209 425/375 |
| 2013/0134630 A1 * | 5/2013 | Miyata | ............... | G03F 7/0002 264/293 |
| 2014/0054331 A1 * | 2/2014 | Muller | ............... | B05C 5/0237 222/504 |
| 2014/0242208 A1 * | 8/2014 | Elsworthy | ............. | B29C 31/042 425/375 |
| 2014/0287139 A1 * | 9/2014 | Farmer | ............... | B29C 64/106 427/212 |
| 2014/0328963 A1 * | 11/2014 | Mark | ............... | B33Y 50/02 425/143 |
| 2014/0361460 A1 * | 12/2014 | Mark | ............... | B29C 31/045 264/248 |
| 2015/0037446 A1 * | 2/2015 | Douglass | ............ | B29C 67/0055 425/131.1 |
| 2017/0157828 A1 * | 6/2017 | Mandel | ............... | B29C 64/209 |
| 2018/0304369 A1 * | 10/2018 | Myerberg | ............. | B22F 3/227 |

* cited by examiner

US 10,880,956 B2

MULTI-STRAND ADDITIVE MANUFACTURING SYSTEM HAVING IMPROVED CORNERING

RELATED APPLICATIONS

This application is based on and claims the benefit of priority from U.S. Provisional Application No. 62/459,398 that was filed on Feb. 15, 2017, the contents of which are expressly incorporated herein by reference.

TECHNICAL FIELD

The present disclosure relates generally to a manufacturing system and, more particularly, to a multi-strand additive manufacturing system having improved cornering.

BACKGROUND

CF3D™ is a known additive manufacturing process, which involves the use of continuous fibers embedded within a matrix material discharging from a moveable print head. The matrix material can be a traditional thermoplastic, a powdered metal, a liquid resin e.g., a UV curable and/or two-part resin), or a combination of any of these and other known matrixes. Upon exiting the print head, a cure enhancer (e.g., a UV light, an ultrasonic emitter, a heat source, a catalyst supply, etc.) is activated to initiate and/or complete curing of the matrix. This curing occurs almost immediately, allowing for unsupported structures to be fabricated in free space. And when fibers, particularly continuous fibers, are embedded within the structure, a strength of the structure may be multiplied beyond the matrix-dependent strength. An example of this technology is disclosed in U.S. Pat. No. 9,511,543 that issued to Tyler on Dec. 6, 2016 ("the '543 patent").

During fabrication via CF3D™, when using multiple separate strands of fiber to produce a ribbon of composite material, creating transverse trajectory changes (i.e., when cornering within a plane of the ribbon), it can be difficult to ensure that each strand of fiber is provided with a correct amount of resin. For example, it may be possible for strands at an inside of the corner to receive too much resin due to a slower rate of discharge from the print head. It may also be possible for the strands at an outside corner to receive too little resin to a faster rate of discharge from the print head. Unless otherwise accounted for, the resulting ribbon may have undesired characteristics.

The disclosed system is directed at addressing one or more of the problems set forth above and/or other problems of the prior art.

SUMMARY

In one aspect, the present disclosure is directed to a head for an additive manufacturing system. The head may include a nozzle configured to discharge multiple fiber strands oriented transversely adjacent each other relative to a travel direction of the head. The head may also include a matrix supply separately associated with each of the multiple fiber strands.

In another aspect, the present disclosure is directed to an additive manufacturing system. The additive manufacturing system may include a support, and a head connected to an end of the support. The head may have a nozzle configured to discharge multiple fiber strands oriented transversely adjacent each other relative to a travel direction of the head, and a matrix supply separately associated with each of the multiple fiber strands. The additive manufacturing system may also include a controller in communication with the matrix supply. The controller may be configured to selectively activate the matrix supply to adjust an amount of matrix advanced from the matrix supply toward each of the multiple fiber strands.

In yet another aspect, the present disclosure is directed to a method of additively manufacturing a composite structure. The method may include wetting a plurality of fiber strands with a priming amount of matrix sufficient to adequately wet only a slowest moving fiber of the plurality of fiber strands. The method may also include determining a travel speed of each of the plurality of fiber strands, and advancing additional matrix toward the plurality of fiber strands in amounts based on the travel speed. The method may further include directing the plurality of fiber strands through a nozzle to discharge adjacent each other, and exposing the plurality of fiber strands to cure energy to cause the matrix to cure.

DETAILED DESCRIPTION

Figure 1:
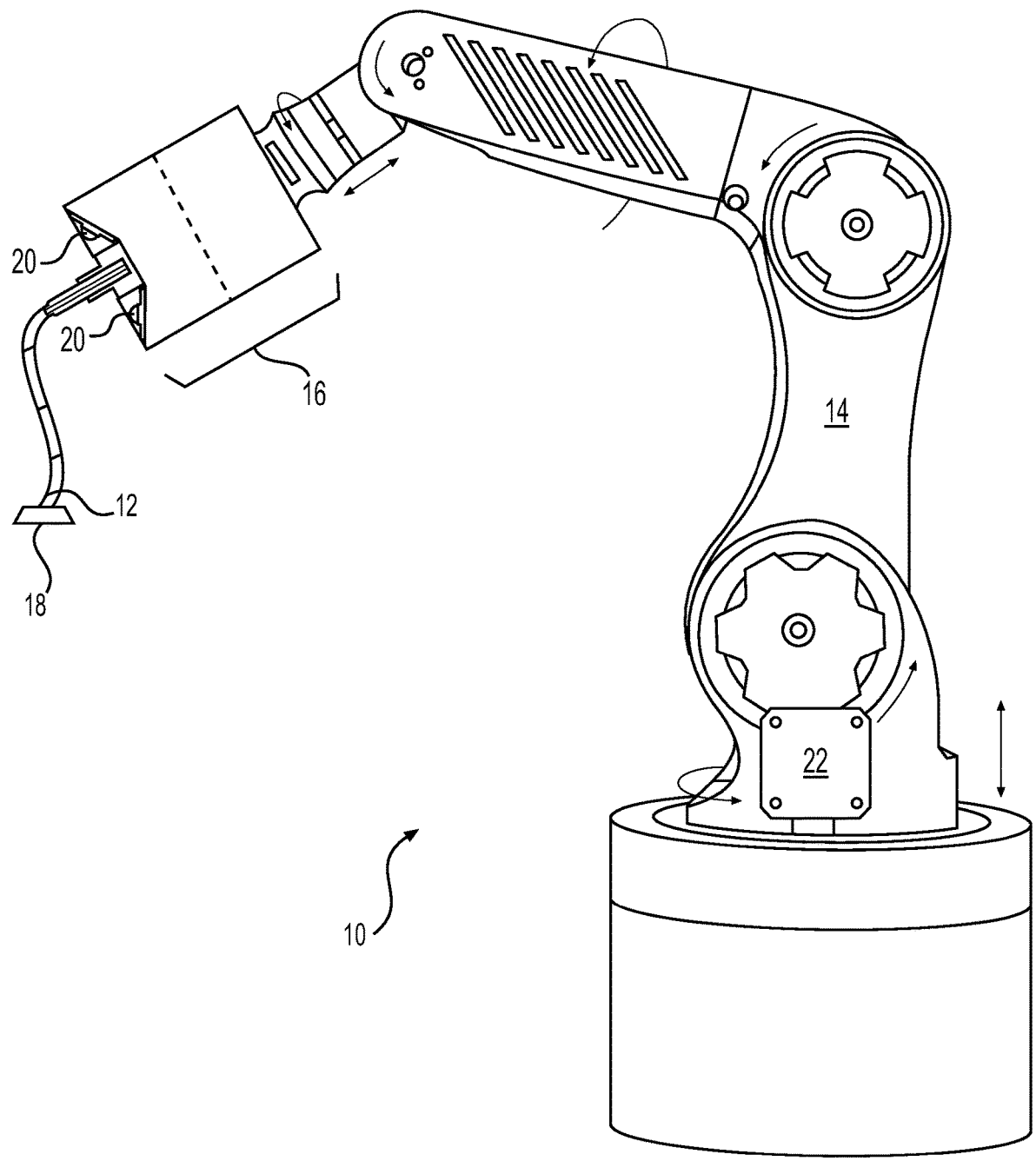
FIG. 1 is a diagrammatic illustration of an exemplary disclosed manufacturing system.

FIG. 1 illustrates an exemplary system 10, which may be used to continuously manufacture a composite structure 12 having any desired cross-sectional shape (e.g., flat, circular, polygonal, etc.). System 10 may include at least a support 14 and a head 16. Head 16 may be coupled to and moved by support 14. In the disclosed embodiment of FIG. 1, support 14 is a robotic arm capable of moving head 16 in multiple directions during fabrication of structure 12, such that a resulting longitudinal axis of structure 12 is three-dimensional. It is contemplated, however, that support 14 could alternatively be an overhead gantry or a hybrid gantry/arm also capable of moving head 16 in multiple directions during fabrication of structure 12. Although support 14 is shown as being capable of multi-axis movements, it is contemplated that any other type of support 14 capable of moving head 16 in the same or in a different manner could also be utilized, if desired. In some embodiments, a drive may mechanically couple head 16 to support 14, and may include components that cooperate to move and/or supply power or materials to head 16.

Head 16 may be configured to receive or otherwise contain a matrix material. The matrix material may include any type of matrix material (e.g., a liquid resin, such as a zero volatile organic compound resin; a powdered metal; etc.) that is curable. Exemplary matrixes include thermosets, single- or multi-part epoxy resins, polyester resins, cationic epoxies, acrylated epoxies, urethanes, esters, thermoplastics, photopolymers, polyepoxides, thiols, alkenes, thiol-enes, and more. In one embodiment, the matrix material inside head 16 may be pressurized, for example by an external device (e.g., an extruder or another type of pump—not shown) that is fluidly connected to head 16 via a corresponding conduit (not shown). In another embodiment, however, the pressure may be generated completely inside of head 16 by a similar type of device. In yet other embodiments, the matrix material may be gravity-fed through and/or mixed within head 16. In some instances, the matrix material inside head 16 may need to be kept cool and/or dark to inhibit premature curing; while in other instances, the matrix material may need to be kept warm for the same reason. In either situation, head 16 may be specially configured (e.g., insulated, chilled, and/or warmed) to provide for these needs.

The matrix material may be used to coat, encase, or otherwise surround any number of continuous reinforcements (e.g., separate fibers, tows, rovings, ribbons, and/or sheets of material) and, together with the reinforcements, make up at least a portion (e.g., a wall) of composite structure 12. The reinforcements may be stored within (e.g., on separate internal spools—not shown) or otherwise passed through head 16 (e.g., fed from external spools). When multiple reinforcements are simultaneously used, the reinforcements may be of the same type and have the same diameter and cross-sectional shape (e.g., circular, square, flat, etc.), or of a different type with different diameters and/or cross-sectional shapes. The reinforcements may include, for example, carbon fibers, vegetable fibers, wood fibers, mineral fibers, glass fibers, metallic wires, optical tubes, etc. It should be noted that the term "reinforcement" is meant to encompass both structural and non-structural types of continuous materials that can be at least partially encased in the matrix material discharging from head 16.

The reinforcements may be exposed to (e.g., coated with) the matrix material while the reinforcements are inside head 16, while the reinforcements are being passed to head 16 (e.g., as a pre-preg material), and/or while the reinforcements are discharging from head 16, as desired. The matrix material, dry reinforcements, and/or reinforcements that are already exposed to the matrix material (e.g., wetted reinforcements) may be transported into head 16 in any manner apparent to one skilled in the art.

The matrix material and reinforcement may be discharged from head 16 via at least two different modes of operation. In a first mode of operation, the matrix material and reinforcement are extruded (e.g., pushed under pressure and/or mechanical force) from head 16, as head 16 is moved by support 14 to create the 3-dimensional shape of structure 12. In a second mode of operation, at least the reinforcement is pulled from head 16, such that a tensile stress is created in the reinforcement during discharge. In this mode of operation, the matrix material may cling to the reinforcement and thereby also be pulled from head 16 along with the reinforcement, and/or the matrix material may be discharged from head 16 under pressure along with the pulled reinforcement. In the second mode of operation, where the matrix material is being pulled from head 16, the resulting tension in the reinforcement may increase a strength of structure 12, while also allowing for a greater length of unsupported material to have a straighter trajectory (i.e., the tension may act against the force of gravity to provide free-standing support for structure 12).

The reinforcement may be pulled from head 16 as a result of head 16 moving away from an anchor point 18. In particular, at the start of structure-formation, a length of matrix-impregnated reinforcement may be pulled and/or pushed from head 16, deposited onto anchor point 18, and cured, such that the discharged material adheres to anchor point 18. Thereafter, head 16 may be moved away from anchor point 18, and the relative movement may cause the reinforcement to be pulled from head 16. It should be noted that the movement of the reinforcement through head 16 could be assisted (e.g., via internal feed mechanisms), if desired. However, the discharge rate of the reinforcement from head 16 may primarily be the result of relative movement between head 16 and anchor point 18, such that tension is created within the reinforcement. It is contemplated that anchor point 18 could be moved away from head 16 instead of or in addition to head 16 being moved away from anchor point 18.

One or more cure enhancers (e.g., one or more light sources, an ultrasonic emitter, a laser, a heater, a catalyst dispenser, a microwave generator, etc.) 20 may be mounted proximate (e.g., within, on, and/or trailing from) head 16 and configured to enhance a cure rate and/or quality of the matrix material as it is discharged from head 16. Cure enhancer 20 may be controlled to selectively expose internal and/or external surfaces of structure 12 to energy (e.g., light energy, electromagnetic radiation, vibrations, heat, a chemical catalyst or hardener, etc.) during the formation of structure 12. The energy may increase a rate of chemical reaction occurring within the matrix material, sinter the material, harden the material, or otherwise cause the material to cure as it discharges from head 16.

A controller 22 may be provided and communicatively coupled with support 14, head 16, and any number and type of cure enhancers 20. Controller 22 may embody a single processor or multiple processors that include a means for controlling an operation of system 10. Controller 22 may include one or more general- or special-purpose processors or microprocessors. Controller 22 may further include or be associated with a memory for storing data such as, for example, design limits, performance characteristics, operational instructions, matrix characteristics, reinforcement characteristics, characteristics of structure 12, and corresponding parameters of each component of system 10. Various other known circuits may be associated with controller 22, including power supply circuitry, signal-conditioning circuitry, solenoid/motor driver circuitry, communication circuitry, and other appropriate circuitry. Moreover, controller 22 may be capable of communicating with other components of system 10 via wired and/or wireless transmission.

One or more maps may be stored in the memory of controller 22 and used during fabrication of structure 12. Each of these maps may include a collection of data in the form of models, lookup tables, graphs, and/or equations. In the disclosed embodiment, the maps are used by controller 22 to determine desired characteristics of cure enhancers 20, the associated matrix, and/or the associated reinforcements at different locations within structure 12. The characteristics may include, among others, a type, quantity, and/or configuration of reinforcement and/or matrix to be discharged at a particular location within structure 12, and/or an amount, intensity, shape, and/or location of desired compacting and curing. Controller 22 may then correlate operation of support 14 (e.g., the location and/or orientation of head 16) and/or the discharge of material from head 16 (a type of material, desired performance of the material, cross-linking requirements of the material, a discharge rate, etc.) with the operation of cure enhancers 20 such that structure 12 is produced in a desired manner.

Figure 2:
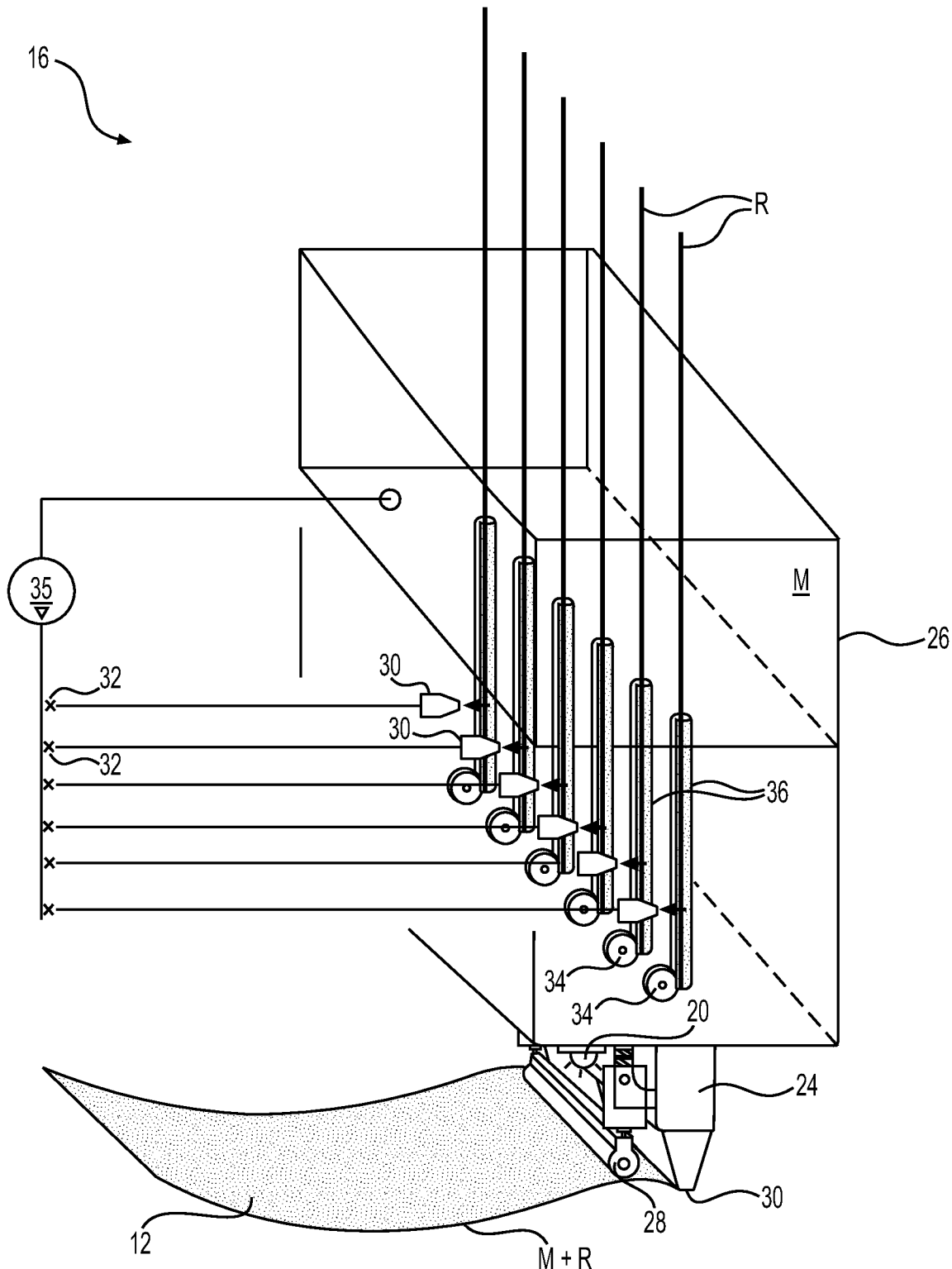
FIG. 2 is a diagrammatic illustration of an exemplary disclosed head that may be utilized with the manufacturing system of FIG. 1.

An exemplary head 16 is disclosed in detail in FIG. 2. Head 16 may include, among other things, at least one nozzle 24 that is fluidly connected to the lower end of a matrix reservoir 26. In the disclosed embodiment, nozzle 24 has a generally rectangular discharge orifice 29 and is at least partially surrounded by cure enhancers 20. Discharge orifice 29 may be configured to discharge a generally flat ribbon or sheet of composite material. It is contemplated, however, that nozzle could alternatively be arranged in an arc, a complete circle, or another configuration, if desired. Any number of reinforcements (represented as R in FIG. 2) may be received at an opposing upper end of reservoir 26, passed axially through reservoir 26 where at least some matrix-impregnation occurs (matrix represented as M in FIG. 2), and discharged from head 16 via nozzle 24. In some applications, it may be helpful for a tip end of nozzle 24 to have a divergent shape to facilitate coalescing of the different matrix-coated fibers into the ribbon or sheet of composite material. For similar reasons, nozzle 24 may also be followed by a compactor 28, if desired.

The matrix impregnation of the reinforcements may occur in several different ways. For example, matrix reservoir 26 could be at least partially filled with matrix such that, as the reinforcements are pulled and/or pushed through reservoir 26, the reinforcements are submerged and soaked in the matrix. Additionally or alternatively, one or more matrix jets 30 (e.g., one matrix jet 30 for each strand, tow, or ribbon of reinforcement) may be located within or downstream of matrix reservoir 26. Jets 30 may be configured to spray or otherwise advance matrix toward the strands and/or tows of reinforcement during passage of the reinforcements through matrix reservoir 26 or from matrix reservoir 26 into nozzle 24. This spraying of reinforcement with matrix may function to separate individual fibers, such that a more even or deeper penetration of the matrix within the reinforcements may occur. In addition, the separate jets 30 may allow for more precise control over an amount of matrix that coats each strand, tow, and/or ribbon. For example, a matrix flow rate of individual jets 30 may be correlated with a linear travel rate of the corresponding reinforcements through matrix reservoir 26, which can vary depending on reinforcement location (e.g., inside or outside location) during cornering of head 16.

The matrix flow rate of jets 30 may be adjusted by selectively throttling the flow of matrix being supplied to jets 30. For example, a valve 32 may be disposed between a supply of matrix (e.g., between a gravity-fed supply or a pump-fed supply) 35 and each jet 30. Valve 32 may be selectively energized (e.g., by controller 22—referring to FIG. 1) to move to any position between a flow-blocking position and a flow-passing position, and a corresponding restriction may be placed on the flow matrix. The position of valve 32 may be varied based on an assumed or detected travel speed of the corresponding fiber strand.

The travel speed of the corresponding fiber strand may be determined by controller 22. For example, as controller 22 generates commands that cause support 14 to move head 16 during the fabrication of structure 12, controller 22 may calculate a corresponding travel speed of each fiber strand being discharged from head 16 (e.g., based on the commanded motion and known kinematics of support 14 and head 16). Alternatively or additionally, one or more encoders (e.g., rotary encoders, optical encoders, magnetic encoders, etc.) 34 may be associated with (e.g., configured to roll over) each fiber strand and configured to generate a signal corresponding to the linear travel speed. In some embodiments, encoders 34 are only idler-type rollers used for signal generation purposes. In other embodiments, encoders 34 may additionally be powered to push the fibers strands through portions of head 16. In yet other embodiments, encoders 34 may function to disperse (e.g., to push) the matrix throughout the associated fiber strand and/or to remove excess (e.g., to squeeze out) matrix. It is contemplated that any one or more of the above-described functions of encoders 34 could be performed by other components of head 16, if desired.

In one example, the fiber strands may travel through channels 36 that are located between matrix reservoir 26 and nozzle 24. In this example, each jet 30 may be in fluid communication with one or more of channels 36, such that the matrix advanced by each jet 30 may be contained within the corresponding channel(s) 36. This may help ensure thorough wetting of the fiber strands, while still allowing the separate fiber strands to be wetted with different quantities and/or flow rates of matrix.

Figure 3:
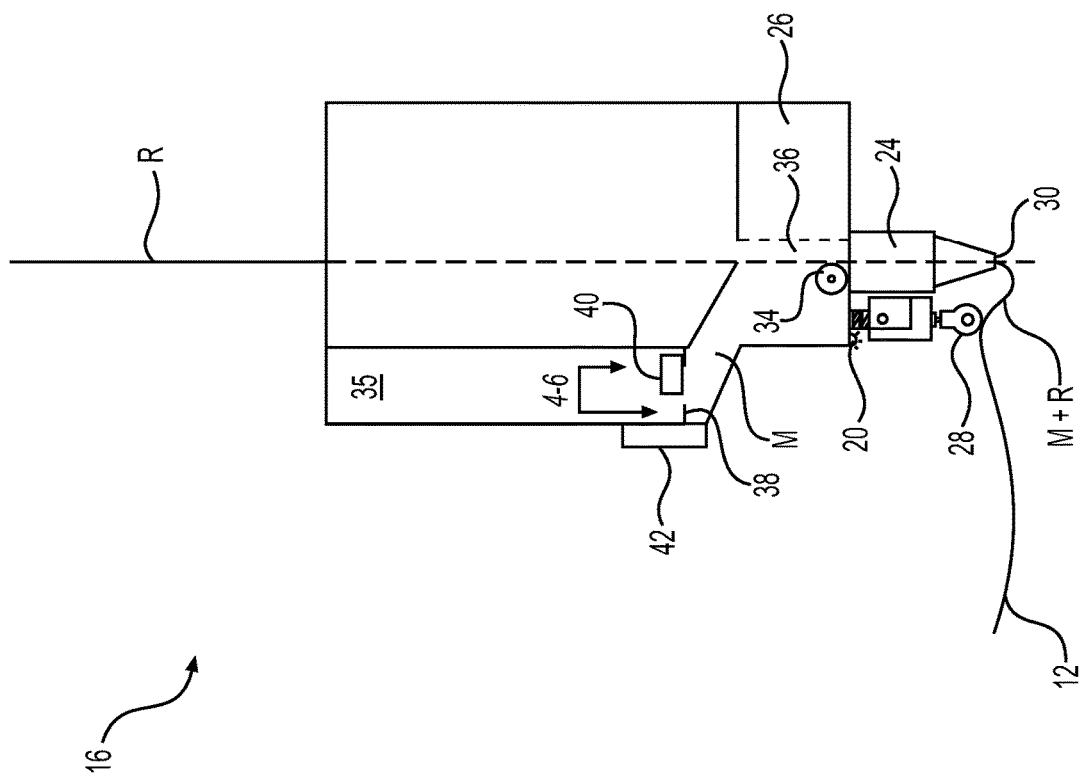

FIG. 3 illustrates an alternative arrangement of head 16. Like head 16 of FIG. 2, head 16 of FIG. 3 includes matrix reservoir 26 fluidly communicating with multiple channels 36, each of which is configured to house a separate fiber or bundle of fibers. In addition, head 16 of FIG. 3 includes nozzle 24 connected to channels 36 and configured to discharge a ribbon of material, which may be compressed by compressor 28 and then cured via cure enhancers 20. However, in contrast to the embodiment of FIG. 2, head 16 of FIG. 3 may include a different matrix supply 35. Matrix supply 35 may be a pressurized supply (e.g., a pump) or only a gravity-fed chamber configured to hold matrix. The matrix from supply 35 may pass through a plurality of inlets 38 that feed separately to one or more individual channels 36.

Figure 4:
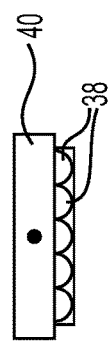
FIGS. 3-6 are additional diagrammatic illustration of another exemplary disclosed head that may be utilized with the manufacturing system of FIG. 1.
Figure 5:
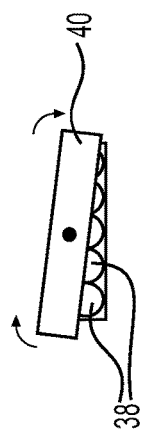
Figure 6:
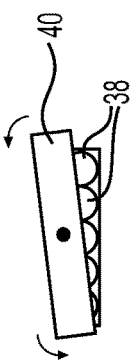

One or more valves (e.g., flapper, butterfly, or other type of restriction valves) 40 may be positioned to selectively close-off portions of inlets 38. For example, valve 40 may be pivotal from a neutral position (shown in FIG. 4) at which all inlets 38 receive and pass along a substantially equal amount of matrix to each of channels 36 and the corresponding fibers housed therein, toward first or second pivoted positions. The first pivot position is shown in FIG. 5, and corresponds with a maximum pivoting of valve 40 in a clockwise direction. (when viewed from a base end of head 16). When in the first pivot position, the inlets 38 located at a left end (relative to the perspective of FIG. 4) may pass matrix to the corresponding channel 36 at a maximum rate, while the inlets 38 located at the right end pass matrix to the corresponding channel 36 at a minimum rate. And the inlets 38 located between the left and right end pass matrix to their corresponding channels 36 at a rate generally proportional to their location between the left and right ends. The second position is shown in FIG. 6, and corresponds with a maximum pivoting of valve 40 in a counterclockwise direction. The result of valve 40 being in the position of FIG. 6 may generally be the opposite of the result of valve 40 being in the position of FIG. 5.

An actuator 42 (e.g., a magnetic actuator, a hydraulic actuator, a mechanical actuator, an electro-mechanical actuator, etc.) may be selectively energized (e.g., by controller 22) to selectively move valve 40 to an infinite number of positions between the first and second positions. These movements may be coordinated with movements of head 16 (e.g., cornering), such that the supply rate of matrix to the different reinforcements discharging transversely from across the width of nozzle 24 may all receive a specified amount of matrix.

INDUSTRIAL APPLICABILITY

The disclosed system may be used to continuously manufacture composite structures having any desired cross-sectional size, shape, length, density, and/or strength. The composite structures may include any number of different reinforcements of the same or different types, diameters, shapes, configurations, and consists, each coated with a common matrix material. In addition, the disclosed head may provide for variable rates of fiber wetting based on travel speeds of the individual fibers pass through the head. Operation of system 10 will now be described in detail.

At a start of a manufacturing event, information regarding a desired structure 12 may be loaded into system 10 (e.g., into controller 22 that is responsible for regulating operations of support 14 and/or head 16). This information may include, among other things, a size (e.g., diameter, wall thickness, length, etc.), a contour (e.g., a trajectory), surface features (e.g., ridge size, location, thickness, length, flange size, location, thickness, length; etc.), connection geometry (e.g., locations and sizes of couplings, tees, splices, etc.), desired weave patterns, weave transition locations, location-specific matrix stipulations, location-specific reinforcement stipulations, density stipulations, etc. It should be noted that this information may alternatively or additionally be loaded into system 10 at different times and/or continuously during the manufacturing event, if desired. Based on the component information, one or more different reinforcements and/or matrix materials may be selectively installed and/or continuously supplied into system 10.

Installation of the reinforcements may be performed by passing individual fiber strands of the reinforcements down through matrix reservoir 26, and then threading the reinforcements through channels 36 and nozzle 24. Installation of the matrix material may include reservoir 26 and/or coupling of matrix supply 35 with jets 30 and/or inlets 38.

Head 16 may then be moved by support 14 under the regulation of controller 22 to cause matrix-coated reinforcements to be placed against or on a corresponding anchor point 18. Cure enhancers 20 may then be selectively activated to cause hardening of the matrix material surrounding the reinforcements, thereby bonding the reinforcements to anchor point 18.

The component information may then be used to control operation of system 10. For example, the reinforcements may be pulled and/or pushed from head 16 (along with the matrix material), while support 14 selectively moves head 16 in a desired manner during curing, such that an axis of the resulting structure 12 follows a desired trajectory (e.g., a free-space, unsupported, 3-D trajectory). As the separate reinforcements are pulled through head 16, the reinforcements may pass through nozzle 24 and join together to form a continuous ribbon or sheet of material.

During some motions of head 16, some of the fiber strands passing through head 16 may travel at different rates. For example, during a cornering motion (e.g., when head 16 pivots about a longitudinal axis), fiber strands located at an inside edge of the associated ribbon may travel in an axial direction through head 16 (and matrix reservoir 26) at a speed that is slower than the travel speed of fiber strands located at an outside edge of the ribbon. This may cause the inside corner-strands to dwell for a longer time in matrix reservoir 26 and to be coated with a greater amount of matrix than the outside corner-strands.

In order to ensure proper and even coating of matrix on the discharging fiber strands, care should be taken to account for the travel speed through and dwell time within matrix reservoir 26 of the individual fiber strands. In one embodiment, matrix reservoir 26 may be configured (e.g., sized, shaped, and or located), such that only a priming amount of matrix clings to the fiber strands after passing through reservoir 26. The priming amount of matrix may be about what is required to adequately coat the slowest moving fiber strand (i.e., the inside corner strand) when support 14 is manipulating head 16 at its lowest speed. Controller 22 may then selectively activate individual jets 30 of the remaining jets (and/or actuator 42) to advance matrix into channels 36 of the remainder of the fiber strands, in an increasing amount away from the slowest moving fiber strand. The activation level of the individual jets 30 (and/or the position of valve 40) may be proportionate to the assumed or detected travel speed of the corresponding fibers.

It will be apparent to those skilled in the art that various modifications and variations can be made to the disclosed systems and head. Other embodiments will be apparent to those skilled in the art from consideration of the specification and practice of the disclosed systems and heads. It is intended that the specification and examples be considered as exemplary only, with a true scope being indicated by the following claims and their equivalents.

What is claimed is:

1. An additive manufacturing system, comprising:
   a matrix reservoir configured to receive multiple fiber strands and to simultaneously at least partially wet each of the multiple fiber strands with a liquid matrix;
   a nozzle configured to simultaneously discharge the multiple fiber strands oriented transversely adjacent each other relative to a travel direction of the head;
   a matrix supply located between the matrix reservoir and the nozzle
   at least one matrix flow adjusting device in fluid communication with the matrix supply and associated with each of the multiple fiber strands; and
   a controller configured to cause the at least one matrix flow adjusting device to selectively wet the multiple fiber strands with different amounts of additional liquid matrix at a same time that the matrix reservoir at least partially wets each of the multiple fiber strands.

2. The additive manufacturing system of claim 1, wherein the at least one matrix flow adjusting device includes a plurality of jets separately controlled by the controller to advance the additional liquid matrix towards the multiple fiber strands.

3. The additive manufacturing system of claim 1, wherein the matrix reservoir is configured to provide matrix to the multiple fiber strands in a priming amount sufficient to adequately wet only a slowest moving fiber of the multiple fiber strands.

4. The additive manufacturing system of claim 2, further including a plurality of channels, each configured to pass one of the multiple fiber strands from the matrix reservoir to the nozzle.

5. The additive manufacturing system of claim 4, wherein each of the plurality of jets is associated with a corresponding one of the plurality of channels.

6. The additive manufacturing system of claim 1, further including a plurality of encoders, each associated with one of the multiple fiber strands and configured to generate signals indicative of travel speeds of the associated ones of the multiple fiber strands through the head.

7. The additive manufacturing system of claim 1, wherein the at least one matrix flow adjusting device includes:
   a plurality of inlets configured to advance the additional liquid matrix from the matrix supply separately towards the multiple fiber strands; and
   at least one valve configured to move and selectively block the plurality of inlets by different amounts.

8. An additive manufacturing system, comprising:
a support;
a head connected to an end of the support and including:
a nozzle configured to discharge multiple fiber strands oriented transversely adjacent each other relative to a travel direction of the head; and
a matrix supply;
at least one matrix flow adjusting device in fluid communication with the matrix supply and separately associated with each of the multiple fiber strands; and
a controller configured to:
determine a travel speed of each of the multiple fiber strands through the head; and
selectively activate the at least one matrix flow adjusting device_ to independently adjust an amount of matrix advanced from the matrix supply toward each of the multiple fiber strands based on the travel speed.

9. The additive manufacturing system of claim 8, further including a plurality of encoders, each associated with one of the multiple fiber strands and configured to generate signals indicative of the travel speed that are directed to the controller.

10. The additive manufacturing system of claim 8, wherein the controller is configured to:
command the support to move the head during discharge of the multiple fiber strands; and
determine the travel speed of each of the multiple fiber strands based on the command and known kinematics of the support and the head.

11. The additive manufacturing system of claim 8, further including:
a compactor configured to compress the multiple fiber strands together to form at least one of a ribbon and a sheet; and
a cure enhancer configured to cure matrix from the matrix supply during discharge of the multiple fiber strands from the nozzle.

12. The additive manufacturing system of claim 8, wherein the at least one matrix flow adjusting device includes a plurality of jets configured to advance the matrix from the matrix supply towards the multiple fiber strands.

13. The additive manufacturing system of claim 12, further including a matrix reservoir located inside the head upstream of the plurality of jets, wherein the multiple fiber strands pass first through the matrix reservoir before exposure to the matrix supply.

14. The additive manufacturing system of claim 13, wherein the matrix reservoir is configured to provide matrix to the multiple fiber strands in a priming amount sufficient to adequately wet only a slowest moving fiber of the multiple fiber strands.

15. The additive manufacturing system of claim 13, further including a plurality of channels, each configured to pass one of the multiple fiber strands from the matrix reservoir to the nozzle, wherein each of the plurality of jets is associated with a corresponding one of the plurality of channels.

16. The additive manufacturing system of claim 8, wherein the at least one matrix flow control device includes:
a plurality of inlets configured to advance a matrix from the matrix supply separately towards the multiple fiber strands;
at least one valve configured to move and selectively block the plurality of inlets by different amounts; and
an actuator selectively energized by the controller to move the at least one valve.

17. An additive manufacturing system, comprising:
a support;
a head connected to and moved by the support, the head including
a nozzle configured to discharge multiple fiber strands oriented transversely adjacent each other relative to a travel direction of the head; and
a matrix supply;
at least one matrix flow adjusting device in fluid communication with the matrix supply and separately associated with each of the multiple fiber strands;
a controller configured to selectively activate the at least one matrix flow adjusting device to adjust an amount of matrix advanced from the matrix supply toward each of the multiple fiber strands based on a travel speed of each of the multiple fiber strands through the head;
a compactor configured to compress the multiple fiber strands together to form at least one of a ribbon and a sheet; and
a cure enhancer configured to cure matrix from the matrix supply during discharge of the multiple fiber strands from the nozzle.

18. The additive manufacturing system of claim 17, further including a plurality of encoders, each associated with one of the multiple fiber strands and configured to generate signals indicative of the travel speed that are directed to the controller.

* * * * *